(12) United States Patent
Kawano (10) Patent No.: US 9,104,909 B2
(45) Date of Patent: Aug. 11, 2015

(54) IMAGE PROCESSING APPARATUS AND METHOD OF PROCESSING IMAGE

(75) Inventor: Atsushi Kawano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/312,785

(22) Filed: Dec. 6, 2011

(65) Prior Publication Data

US 2012/0155707 A1 Jun. 21, 2012

(30) Foreign Application Priority Data

Dec. 15, 2010 (JP) ................................. 2010-279889
Dec. 15, 2010 (JP) ................................. 2010-279890

(51) Int. Cl.
*G06K 9/00* (2006.01)
(52) U.S. Cl.
CPC .................................. *G06K 9/00342* (2013.01)
(58) Field of Classification Search
CPC .............................. G06K 9/00342; G06T 7/004
See application file for complete search history.

(56) References Cited

U.S. PATENT DOCUMENTS

| | | | | |
|---|---|---|---|---|
| 6,031,568 A | * | 2/2000 | Wakitani | 348/169 |
| 2007/0086648 A1 | * | 4/2007 | Hayashi | 382/154 |
| 2008/0199056 A1 | * | 8/2008 | Tokuse | 382/118 |
| 2009/0231453 A1 | * | 9/2009 | Huang | 348/220.1 |
| 2009/0238549 A1 | * | 9/2009 | Kanayama | 396/95 |
| 2009/0238550 A1 | * | 9/2009 | Kanayama | 396/95 |
| 2010/0007763 A1 | * | 1/2010 | Yokohata | 348/222.1 |
| 2010/0073497 A1 | * | 3/2010 | Katsumata et al. | 348/211.99 |
| 2011/0267489 A1 | * | 11/2011 | Sagawa et al. | 348/222.1 |

FOREIGN PATENT DOCUMENTS

| | | |
|---|---|---|
| JP | H06-176153 A | 6/1994 |
| JP | 2002-373332 A | 12/2002 |
| JP | 2006-146429 A | 6/2006 |
| JP | 2007-251257 A | 9/2007 |
| JP | 2008-234169 A | 10/2008 |
| JP | 2009-211311 A | 9/2009 |
| JP | 2010-088093 A | 4/2010 |

* cited by examiner

*Primary Examiner* — Vu Le
*Assistant Examiner* — Guillermo Rivera-Martinez
(74) *Attorney, Agent, or Firm* — Canon U.S.A., Inc. IP Division (57) ABSTRACT

An image processing apparatus includes a first detecting unit configured to detect an object in an image; a determining unit configured to determine a moving direction of the object detected by the first detecting unit; and a second detecting unit configured to perform detection processing of detecting whether the object detected by the first detecting unit is a specific object on the basis of the moving direction of the object determined by the first determining unit.

26 Claims, 9 Drawing Sheets

| ID | POSITION | WIDTH | HEIGHT | SKIP |
|---|---|---|---|---|
| 12 | (24, 56) | 15 | 60 | F |
| 6 | (52, 31) | 23 | 56 | F |
| 7 | (23, 16) | 4 | 2 | T |
| 2 | (76, 88) | 30 | 80 | F |
|  |  |  |  |  |

| ID | POSITION | WIDTH | HEIGHT | PATTERN |
|----|----------|-------|--------|---------|
| 12 | (24, 56) | 15 | 60 | FRONT |
| 6 | (52, 31) | 23 | 56 | FRONT |
| 7 | (23, 16) | 4 | 2 | SIDE |
| 2 | (76, 88) | 30 | 80 | FRONT |
|  |  |  |  |  |

FIG. 9

IMAGE PROCESSING APPARATUS AND METHOD OF PROCESSING IMAGE

BACKGROUND OF THE INVENTION

1. Field of the Invention

The present invention relates to an image processing apparatus for detecting a target object in an image and a method of processing an image.

2. Description of the Related Art

In the past, a specific object, such as a human face or body, was detected in an image through pattern matching. For example, a known image processing apparatus extracts local patterns by applying a matching pattern to the entire image as the size of the image is changed and calculates local characteristic values. Then, a human body is detected in the image on the basis of the sum of weighted local characteristics (for example, refer to Japanese Patent Laid-Open No. 2009-211311). A known image processing apparatus efficiently detects an object by dividing an image into sections and carrying out processing in accordance with the priority levels of the sections. The priority level of each section and each adjoining section in which a target object has been detected is set high (for example, refer to Japanese Patent Laid-Open No. 2008-234169). It has been known that the method of face detection can be changed depending on the orientation of the camera body (for example, refer to Japanese Patent Laid-Open No. 2010-088093). It is also known that an object can be tracked through template matching (for example, refer to Japanese Patent Laid-Open No. 2002-373332).

When a human body is detected by applying a matching pattern to the entire image, the processing load increases as the size of the image increases. For example, in a monitoring camera image, the object may move in any direction and not necessarily move in a direction in which the face and body of the object can be easily detected. The detection accuracy of human body detection using a specific matching pattern changes depending on the viewing angle and size of the object. When human body detection is performed by dividing an image into sections and setting priority levels of the divided sections on the basis of past detection results, an object may not be efficiently detected because the object moves. With monitoring cameras, processing load needs to be reduced to enable real-time processing.

With human body detection using a specific matching pattern, a human body may not be detected accurately, regardless of the image quality of the object. Even when the method of face detection is changed in accordance with the orientation of the camera body, the face region may not be accurately detected.

SUMMARY OF THE INVENTION

To solve the problems described above, the present invention provides an image processing apparatus and a method processing an image that enable efficient detection of an object, regardless of the orientation and size of the object.

Accordingly, the present invention provides an image processing apparatus including a first detecting unit configured to detect an object in an image; a first determining unit configured to determine a moving direction of the object detected by the detecting unit; and a second detecting unit configured to perform detection processing of detecting whether the object detected by the first detecting unit is a specific object on the basis of the moving direction of the object determined by the first determining unit.

According to the present invention, objects that are more likely to be detected as a specific object in an image can be detected. Therefore, the efficiency of detecting a specific object in an image is improved.

According to the present invention, an object can be detected efficiently, regardless of the moving direction of the object.

Further features of the present invention will become apparent from the following description of exemplary embodiments with reference to the attached drawings.

DESCRIPTION OF THE EMBODIMENTS

Embodiments of the present invention will be described in detail below with reference to the accompanying drawings. The configurations described in the embodiments below are merely examples, and the present invention is not limited to the configurations illustrated in the drawings.

First Embodiment

Figure 1A:
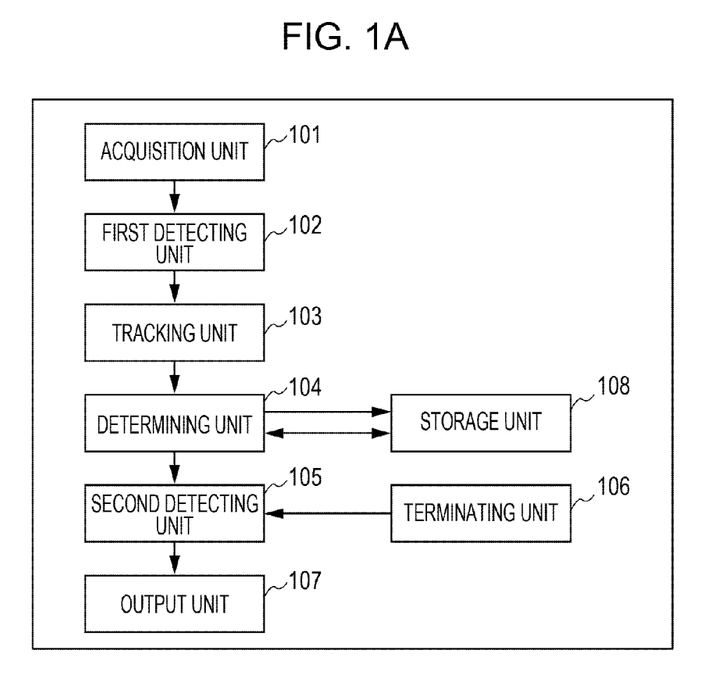
FIG. 1A illustrates an example configuration of an image processing apparatus according to the present invention.

The configuration of an image processing apparatus according to this embodiment will be described with reference to FIG. 1A. The components illustrated in FIG. 1A may constitute physically independent hardware or may constitute at least one instance in software having a function equivalent to the hardware.

An acquisition unit 101 acquires time-sequential images to be processed, which have been captured by a camera. The acquisition unit 101 may acquire images stored in a server or an external memory.

A first detecting unit 102 detects an object in an image acquired by the acquisition unit 101. The first detecting unit 102 is capable of detecting multiple objects. In this embodiment, the information about an object detected by the first detecting unit 102 contains the position of the object in the image, a rectangle circumscribing the object, and the size of the object. As a method of detecting an object, an inter-frame differencing technique or a background differencing technique may be used. The method of detecting an object is not limited to an inter-frame differencing technique or a background differencing technique, so long as the information described above can be acquired.

A tracking unit 103 links an object detected by the first detecting unit 102 in an old image acquired by the acquisition unit 101 and an object detected by the first detecting unit 102 in a current image acquired by the acquisition unit 101. Such linking is possible by adding the same object ID that has been added to the object detected in the old image to the object detected in the current image. A new object ID is added to an object that has newly appeared.

A determining unit 104 determines the content of a detection process depending on the moving direction the object detected by the first detecting unit 102. The content of the detection process includes, for example, the order of performing detection on each of the multiple objects detected by the first detecting unit 102 to determine whether each object is a specific object. The content of the detection process includes, for example, the type of detection processing (for example, pattern matching or detection based on object size) for determining whether each object detected by the first detecting unit 102 is a specific object. The content of the detection process includes, for example, detection criteria for performing certain types of detection processing (for example, a matching pattern used in pattern matching, a local characteristic value used as a reference, etc.). For example, when performing detection processing by pattern matching, the content contains information about which matching pattern is to be used as the detection reference. When performing detection processing using local characteristic values, the content contains information about which local characteristic value is to be used as a detection reference.

Figure 1B:
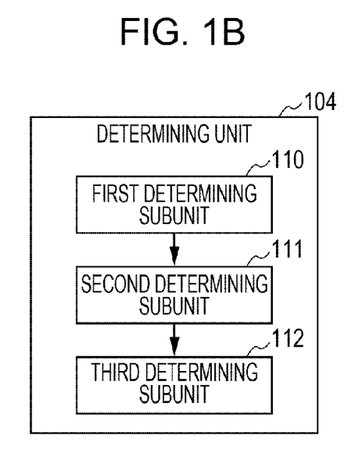
FIG. 1B illustrates an example configuration of a determining unit according to a first embodiment.

FIG. 1B illustrates the configuration of the determining unit 104 according to this embodiment. A first determining subunit 110 determines the moving directions of the objects detected by the first detecting unit 102.

A second determining subunit 111 determines the priority levels used for determining whether each object is a specific object on the basis of the moving directions of the objects determined by the first determining subunit 110.

A third determining subunit 112 determines which object among the objects detected by the first detecting unit 102 is to receive detection processing on the basis of the characteristic values of the objects detected by the first detecting unit 102. That is, the third determining subunit 112 determines whether detection processing by the second detection unit 105, which is described below, is to be performed on each object detected by the first detecting unit 102 on the basis of the characteristic value of the corresponding object.

Figure 2:
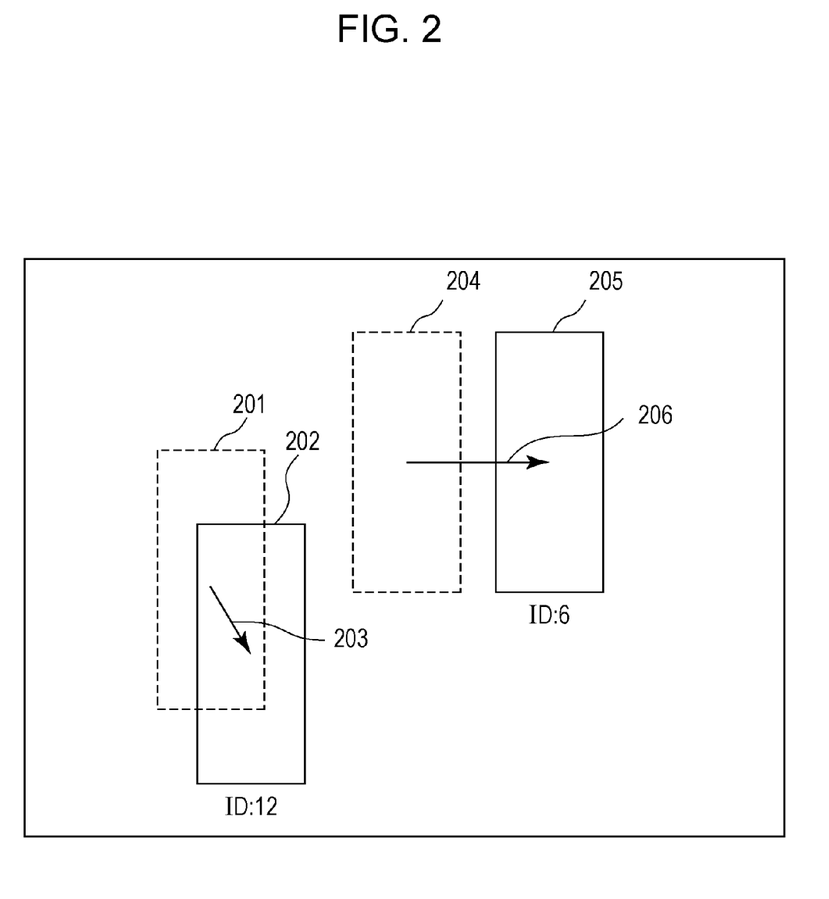
FIG. 2 illustrates the movement of objects in an image.

The process of determining priority levels by the determining unit 104 will be described with reference to FIGS. 2 and 3. FIG. 2 illustrates an example of the moving directions of objects in an nth frame. The object represented by an object ID 12 has moved from position 201 in the (n−1)th frame to position 202 in the nth frame; thus the movement of the object ID 12 can be represented as a position vector 203. The object represented by an object ID 6 has moved from position 204 in the (n−1)th frame to position 205 in the nth frame; thus the movement of the object ID 6 can be represented as a position vector 206. In this embodiment, the moving direction angle is determined on the basis of a position vector based on two frames. Instead, however, the moving direction angle may be determined on the basis of the scalar product of position vectors of multiple frames. When the first detecting unit 102 detects an object by a movement vector, the moving direction of the object may be determined from the movement vector. In this way, the first determining subunit 110 of the determining unit 104 determines the moving directions of the objects detected by the first detecting unit 102.

Figure 3:
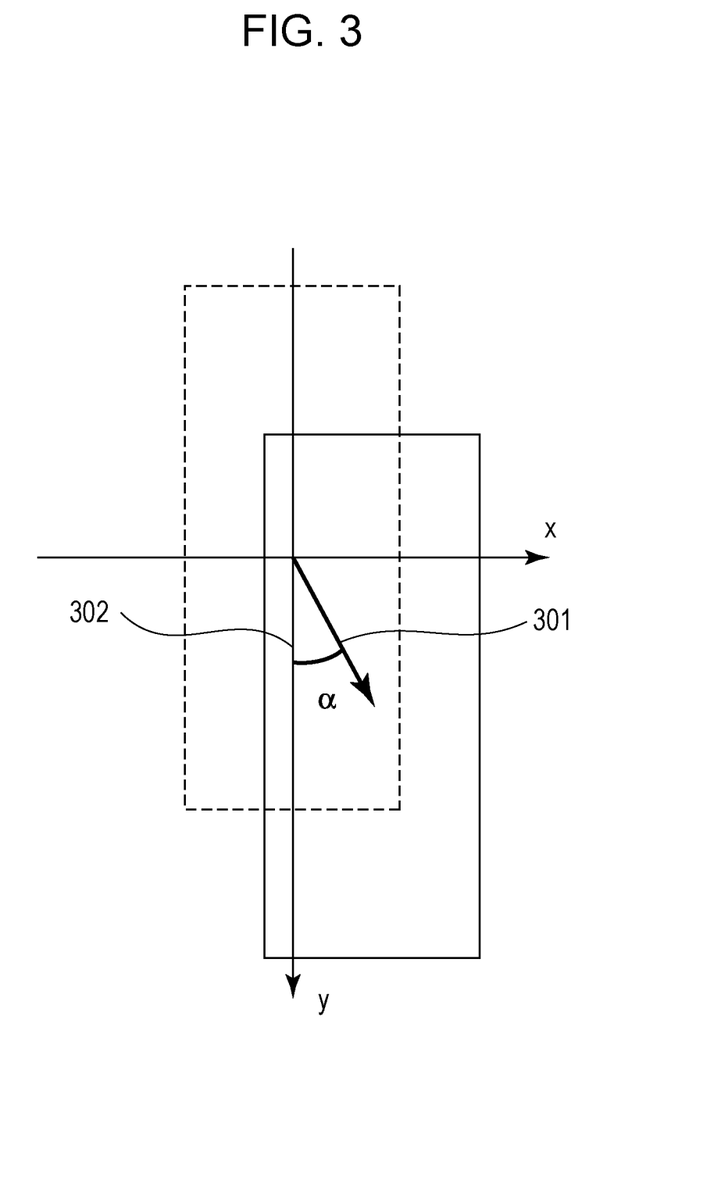
FIG. 3 illustrates the moving direction angle of an object in an image.

FIG. 3 illustrates an example of a moving direction angle of an object. In this drawing, the rightward direction is the forward direction along the x axis, and the downward direction is the forward direction along the y axis. A moving direction angle 302 of a position vector 301 is determined by setting the forward direction along the y axis as 0°. In FIG. 3, α represents the moving direction angle 302.

In this embodiment, the second determining subunit 111 of the determining unit 104 determines an evaluation value from one of Expressions 1 to 4 on the basis of the moving direction angle 302. The determining unit 104 assigns higher priority levels to smaller evaluation values. Expression 1 is used when the moving direction angle α is not smaller than 0° and smaller than 90°; Expression 2 is used when the moving direction angle α is not smaller than 90° and smaller than 180°; Expression 3 is used when the moving direction angle α is not smaller than 180° and smaller 270°; and Expression 4 is used when the moving direction angle α is not smaller than 270° and smaller than 360°; When objects have the same evaluation value, the object having the smaller object ID is assigned with a higher priority level.

$$\text{Val dir}=\alpha \tag{1}$$

$$\text{Val dir}=|\alpha-180| \tag{2}$$

$$\text{Val dir}=\alpha-180 \tag{3}$$

$$\text{Val dir}=|\alpha-360| \tag{4}$$

In this way, the second determining subunit 111 of the determining unit 104 sets higher priority levels for objects moving vertically in the image and lower priority levels for objects moving horizontally in the image. The method of assigning priority levels is not limited thereto. For example, if larger evaluation values are assigned with higher priority levels, objects moving horizontally in the image can be assigned with higher priority levels than objects moving vertically in the image. Instead, priority levels may be assigned in accordance with the moving direction angle 302, without using Expressions 1 to 4. When the first detecting unit 102 detects multiple objects, the second determining subunit 111 of the determining unit 104 assigns priority levels to the objects on the basis of the moving directions of the objects. When the first detecting unit 102 detects multiple objects, the determining unit 104 according to this embodiment assigns priority levels to the objects so as to determine whether the characteristic values of the objects satisfy a predetermined condition in a descending order of priority level. That is, in this embodiment, the determining unit 104 assigns priority levels to regions on which human body detection is to be performed on the basis of the size of the objects detected by the first detecting unit 102 and the tracking results of the tracking unit 103.

Figure 4:
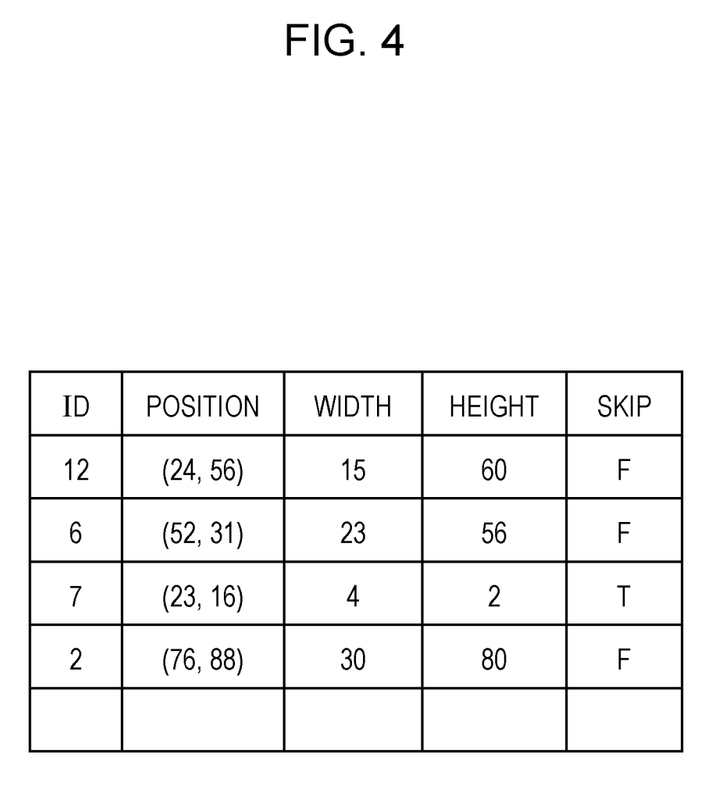
FIG. 4 is an example priority table according to the first embodiment.

Then, the third determining subunit 112 of the determining unit 104 determines the size of the objects in a descending order of priority level. When the size of an object is smaller than a predetermined threshold, the third determining subunit 112 sets a skip flag indicating that detection processing, which is described below, is not to be performed. The threshold of object size is a value set in advance by an instruction from a user. FIG. 4 illustrates example results of setting priority levels and skip flags.

Information illustrated in FIG. 4 is stored in a storage unit 108. A skip flag is set on the basis of the size of an object detected by the first detecting unit 102; instead, a skip flag may be set on the basis of some other value. A skip flag may be set on the basis of any attribute that can be used to sort the objects, such as moving direction, object height, object width, change of object area, aspect ratio of object shape (ratio of height to width of object), or moving speed of object. In this way, the third determining subunit 112 determines, on the basis of the characteristic values of the detected objects, whether detection processing by the second detection unit 105 is to be performed on the detected objects in an order corresponding to the moving directions determined by the first determining subunit 110.

By not performing detection processing on objects having skip flags, the detection probability of detecting a target object among the objects detected by the first detecting unit 102 can be increased. The amount of processing required for detecting a target object among the objects detected by the first detecting unit 102 can be decreased. However, detection processing using skip flags is not an essential step in the present invention. After determining priority of the objects detected by the first detecting unit 102, the detection processing step described below may be performed without setting skip flags.

The second detection unit 105 detects a human body by performing pattern matching on regions corresponding to the objects detected by the first detecting unit 102. The method of detection is not limited to pattern matching. The second detection unit 105 according to this embodiment performs human body detection on the objects in order from the object with the highest priority and not having priority and skip flags set by the determining unit 104. In this way, the second detection unit 105 determines whether to perform detection processing on the objects detected by the first detecting unit 102 to detect a specific object on the basis of the skip flags set by the determining unit 104. When skip flags are not set, the second detection unit 105 performs human body detection on the objects in a descending order of priority level.

In this way, the second detection unit 105 detects a specific object among the objects detected by the first detecting unit 102 in an order corresponding to the priority levels determined by the determining unit 104. The priority levels are assigned on the basis of the moving directions of the objects. For example, when the second detection unit 105 is to detect a human body in an acquired image, human body detection is performed on an object that is approaching the camera used for acquiring the image with priority over objects moving in other directions. Objects that are moving away from the camera may also be assigned with the same priority level as that of approaching objects. Whether an object is approaching the camera is determined on the basis of the moving direction in the image, i.e., the angle of the moving direction to a vertical axis in the image. Instead, the detection order may be directly set on the basis of such angles, without assigning priority levels.

For example, when a specific human face image is used as a pattern for pattern matching, by placing priority on an object that is approaching the camera, as described above, pattern matching can be performed on a face facing the camera with priority over objects facing other directions. In this way, by performing detection on images that intensely show the characteristic of a target object, the accuracy of detecting the target object can be increased. Since detection is performed with priority on objects in a descending order of probability of detecting a target object, detection can be performed efficiency.

In this embodiment, the detection target is a human body, but the detection target is not limited thereto. The detection target may be any specific object, such as a human face, an automobile, an animal, or a solid body. The second detection unit may be configured to detect various different specific objects, enabling multiple detection processes to be carried out simultaneously.

A desired process may be selected among the multiple detection processes in accordance with the object attribute used for setting skip flags, such as the size of the object or the aspect ratio, to perform detection. For example, a human-body detection unit and an automobile detection unit may be provided as the second detection unit 105. A user may set, in advance, a threshold defining the minimum size of an automobile shown in an image. When the size of the object detected by the first detecting unit 102 is smaller than the minimum automobile size, processing is not carried out by the automobile detection unit but carried out only by the human-body detection unit. In contrast, when the object size is larger than the threshold, processing is carried out by the automobile detection unit. When the object size is larger than the threshold, it is possible that a group of people has been detected as a single object; therefore, processing is also carried out by the human-body detection unit. In this way, the second detection unit 105 selects one of the specific objects as a target object to be detected in accordance with the characteristic values of an object detected by the first detecting unit 102 and performs detection. Accordingly, a plurality of detection targets can be efficiently detected.

A terminating unit 106 determines the termination of a human-body detection process performed by the second detection unit 105 on the basis of the elapsed processing time. The threshold of elapsed processing time for determining termination is a value set in advance in accordance with an instruction from a user. Determination of the termination of a detection process is not limited to that based on the amount of time that has elapsed from the start of the detection process. Termination of a detection process may be determined on the basis of, for example, the number of human bodies detected by the second detection unit 105 and the number of times the second detection unit 105 has performed a human-body detection process. An output unit 107 outputs, to an external unit, the detection result of the first detecting unit 102, the tracking state of the tracking unit 103, and the detection result of the second detection unit 105.

Figure 5:
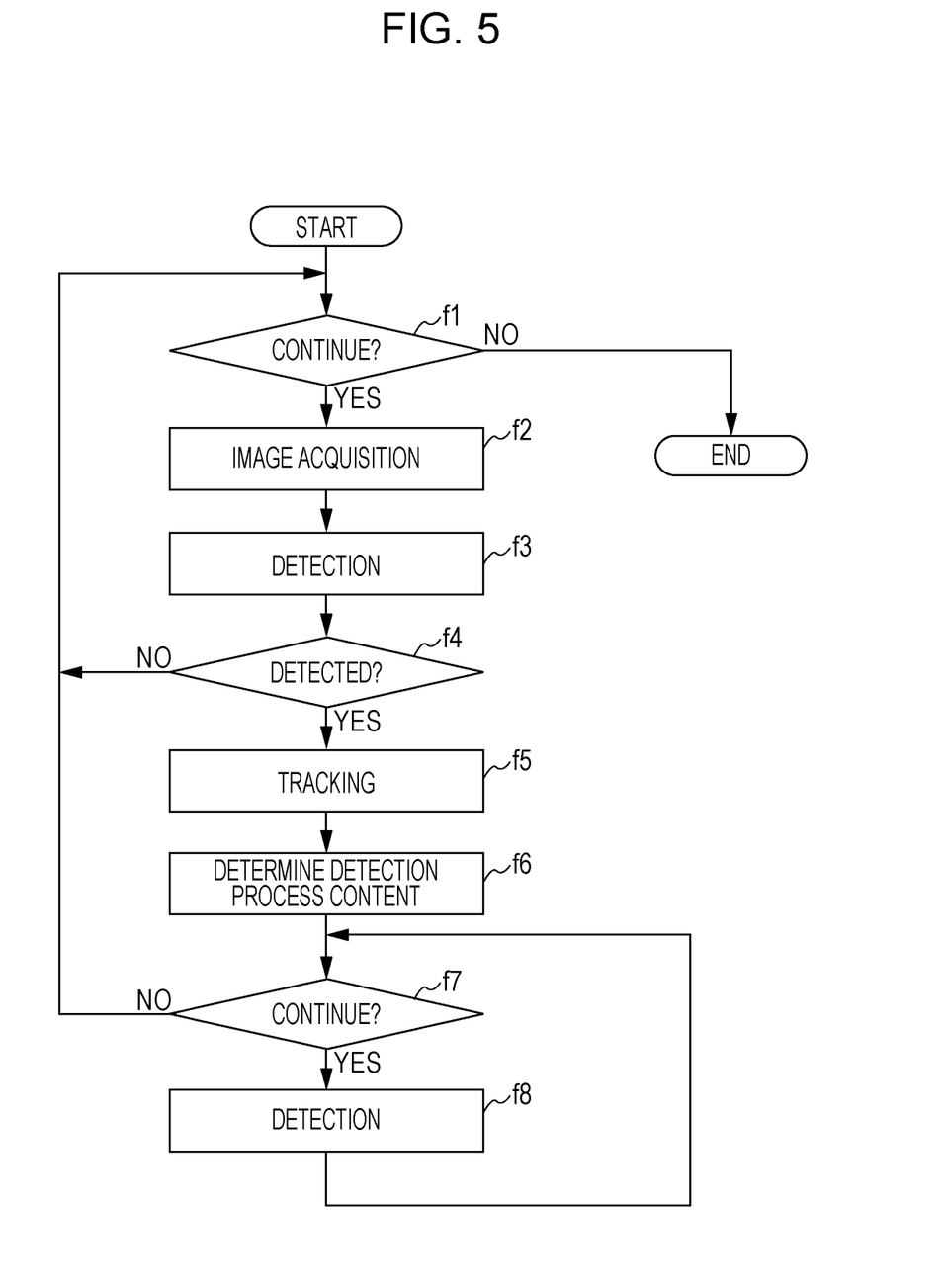
FIG. 5 is a flow chart illustrating the operation of an image processing device according to the present invention.
Figure 6:
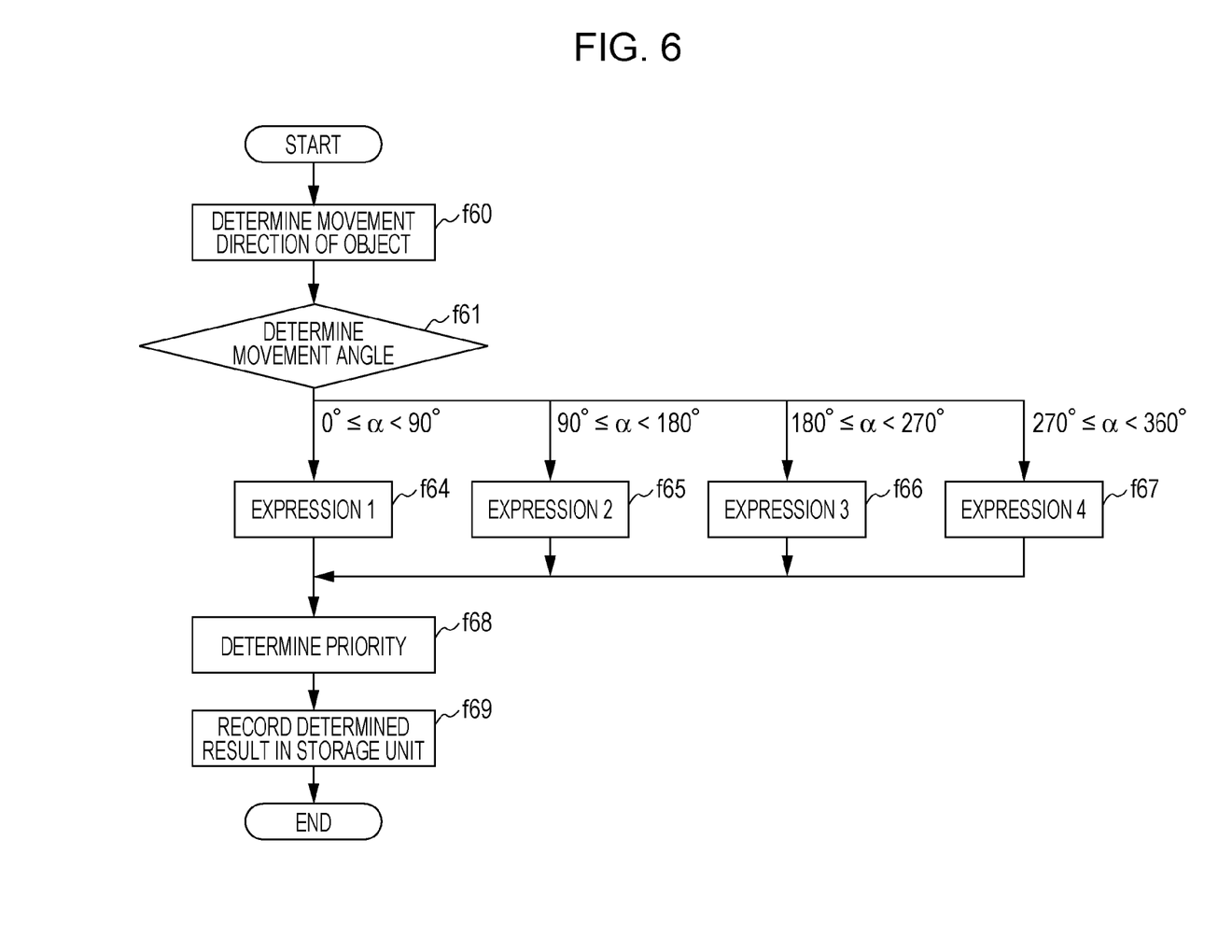
FIG. 6 is a flow chart illustrating the process of priority level determination by the image processing apparatus according to the first embodiment.

FIGS. 5 and 6 are flow charts illustrating the operation of the image processing apparatus according to this embodiment. For an image processing apparatus with a built-in processor and memory, the flows illustrated in FIGS. 5 and 6 represent programs for the processor to execute the steps in FIGS. 5 and 6. The processor built-in the image processing unit is a computer and executes programs read out from the memory built in the image processing apparatus. The memory built in the image processing apparatus is a recording medium holding the programs in a form readable by the processor.

First, the acquisition unit 101 determines whether or not to continue acquiring images (f1). The decision in Step f1 can be made on the basis of a user instruction input via an input unit (not shown). Instead, image acquisition may be ended when a target object is detected in an image. The method of making a decision is not limited thereto. If image acquisition is to be continued, the acquisition unit 101 acquires an image from an external unit (f2).

Next, the first detecting unit 102 detects an object in the image acquired by the acquisition unit 101 (f3) In this embodiment, when detecting an object, the first detecting unit 102 acquires information about the position of the object on the image, the rectangle circumscribing the object, and the size of the object. As a method of detecting an object, an inter-frame differencing technique or a background differencing technique may be used. The method of detecting an object is not limited to an inter-frame differencing technique or a background differencing technique, so long as the information described above can be acquired.

Subsequently, the detection result is determined (f4). That is, it is determined whether the first detecting unit 102 has detected an object in the image acquired by the acquisition unit 101. If the first detecting unit 102 has not detected an object (NO in Step f4), the process returns to Step f1.

If an object is detected (YES in Step f4), the tracking unit 103 tracks the object (f5). In the tracking process, the tracking unit 103 tracks the object detected by the first detecting unit 102. The tracking unit 103 does not have to track all of the objects detected by the first detecting unit 102. For example, whether tracking is to be performed may be determined on the basis of information about the object detected by the first detecting unit 102 (for example, the position of the object in the image, the rectangle circumscribing the object, and the size of the object). For example, when the size of a detected object is smaller than the threshold, tracking may not be performed on the detected object. Not only the object size but also other sets of information detected by the first detecting unit 102 may be compared to thresholds to determine whether an object should be tracked. In this way, the amount of processing required for tracking multiple detected objects by the determining unit 104 can be reduced.

Then, the determining unit 104 determines the content of the detection process (f6). The determining unit 104 determines the content of the detection process in accordance with the moving directions of the objects detected by the first detecting unit 102. The content of the detection process includes, for example, the order of performing detection processing on the multiple objects detected by the first detecting unit 102. The content of the detection process includes, for example, the type of detection processing for detecting a specific in the objects detected by the first detecting unit 102 (for example, detection processing based on pattern matching, object size, etc.). The content of detection process includes, for example, which detection criterion for performing a specific type of detection processing is to be selected for performing detection processing (for example, a matching pattern used in pattern matching, or local characteristic values used as references). In this embodiment, the determining unit 104 determines the priority levels of objects on which detection processing is performed.

Next, it is determined whether the detection processing is to be continued or ended on the basis of a decision made by the terminating unit 106 (f7). For example, when the first detecting unit 102 detects multiple objects in an image, the terminating unit 106 determines whether to perform detection processing on a second object, after detection processing is performed on a first object. The terminating unit 106 determines whether to continue or end detection processing on the basis of, for example, the number of human bodies detected by the second detection unit 105 or the number of times the second detection unit 105 has performed human-body detection. Instead, the terminating unit 106 may determine whether to continue or end detection processing on the basis of a user instruction input via an input unit (not shown). Instead, detection processing may be ended when a target image is detected. The method of making the decision is not limited thereto. When detection processing is to be continued (YES in Step f7), the second detection unit 105 performs human-body detection on object areas in a descending order of priority. When detection processing is terminated (NO in Step f8), the process returns to Step f1.

Next, details of priority order determination in Step f6 according to this embodiment will be described in detail with reference to the flow chart in FIG. 6. The determining unit 104 determines the moving direction angle of an objects detected by the first detecting unit 102 (f60).

Next, the determining unit 104 determines the moving direction angle 302 (angle α) (f61). In this embodiment, the determining unit 104 determines the angle range contains the angle α: not smaller than 0° and smaller than 90°; not smaller than 90° and smaller than 180°; not smaller than 180° and smaller than 270°; and not smaller than 270° and smaller than 360°.

When the angle α is not smaller than 0° and smaller than 90°, the determining unit 104 uses the angle α and Expression 1 to determine an evaluation value (f64). When the angle α is not smaller than 90° and smaller than 180°, the determining unit 104 uses the angle α and Expression 2 to determine the evaluation value (f65). When the angle α is not smaller than 180° and smaller than 270°, the determining unit 104 uses the angle α and Expression 3 to determine the evaluation value (f66). When the angle α is not smaller than 270° and smaller than 360°, the determining unit 104 uses the angle α and Expression 4 to determine the evaluation value (f67).

After determining the evaluation value in this way, the determining unit 104 determines the priority order for detection processing for each detected object on the basis of the determined evaluation value (f68). For the same evaluation values, the determining unit 104 sets an object having a smaller object ID with higher priority.

The angle ranges listed above are merely examples and are not limited thereto. In Step f61 in this embodiment, the process follows four different flows; instead, there may be more or less than four flows in which different detection methods are used. Then, the priority levels determined by the determining unit 104 are stored in the storage unit 108 (f69). In this way, the determining unit 104 according to this embodiment performs priority order determination in Step f6.

With the configuration described above, objects that are more likely to be detected as a specific object are detected. Accordingly, the efficiency of detecting a specific object in an image is improved.

Second Embodiment

In the second embodiment, the determining unit 104 changes type of detection processing in accordance with the moving directions of objects.

In this embodiment, the determining unit 104 selects a matching pattern to be used in the human-body detection process, which is described below, on the basis of the size of the object detected by the first detecting unit 102 and the tracking result of the tracking unit 103. In this embodiment, the second detection unit 105 can perform detection processing by selecting a matching pattern that is more likely to detect an object in accordance with the orientation of the object, which is presumed from the moving direction of the object detected by the first detecting unit 102. The configuration of the other components is the same as that described in the first embodiment with reference to FIG. 1A; therefore, descriptions thereof will not be repeated.

Figure 1C:
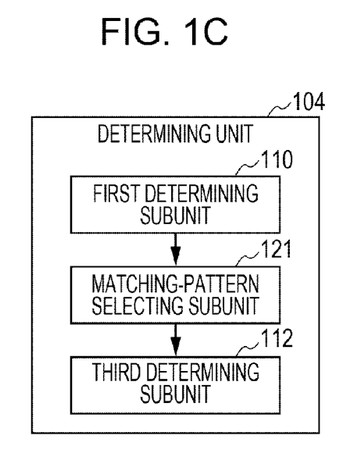
FIG. 1C illustrates an example configuration of a determining unit according to a second embodiment.

The configuration of the determining unit 104 according to this embodiment will be described with reference to FIG. 1C. The determining unit 104 according to this embodiment includes a matching-pattern selecting subunit 121, instead of the second determining subunit 111 according to the first embodiment. The matching-pattern selecting subunit 121 selects a matching pattern for matching an object detected by the first detecting unit 102 in accordance with the moving direction of the corresponding object.

Figure 7A:
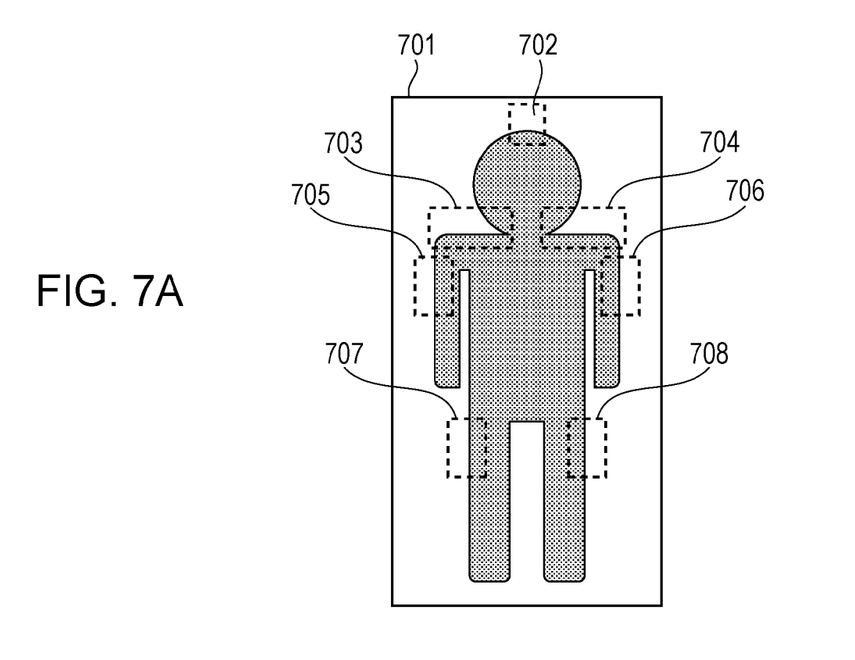
FIG. 7A illustrates an example matching pattern for a forward-facing object according to the second embodiment.
Figure 7B:
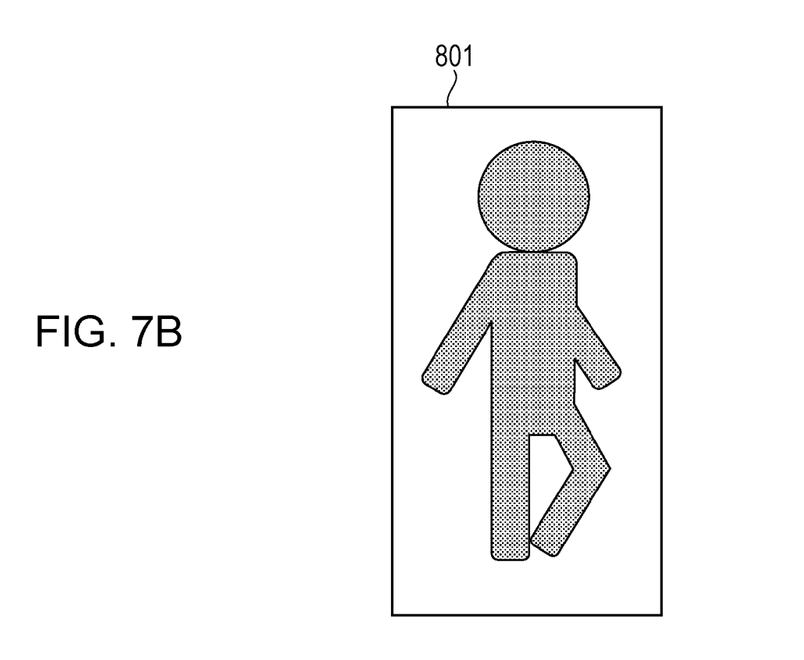
FIG. 7B illustrates an example matching pattern for a lateral-facing object according to the second embodiment.

Example matching patterns are illustrated in FIGS. 7A and 7B. FIG. 7A illustrates example matching patterns for detecting a forward-facing human body. A matching pattern 701 is, for example, a luminance pattern of 30×80 pixels. The rectangles included the matching pattern 701 are local patterns. A local pattern 702 is used for extracting the edge strength in the horizontal direction of the head area. Local patterns 703 and 704 are used for extracting the edge strength of the shoulder line. Local patterns 705 and 706 are used for extracting the edge strength in the vertical direction of the arms. Local patterns 707 and 708 are used for extracting the edge strength in the vertical direction of the legs. The local patterns described above are merely examples and are not limited to the four areas illustrated in FIG. 7A. An example matching pattern for detecting a lateral-facing human body is illustrated in FIG. 7B. The matching patterns in FIGS. 7A and 7B differ in the positions and sizes of the local patterns and the calculation method of local characteristic values, which is described below. The matching patterns are not limited to forward-facing and lateral-facing objects; matching patterns corresponding to objects positioned at different angles, such as an oblique angle or a top angle, may also be used. The matching patterns are not limited to those corresponding to the entire body; matching patterns corresponding to the upper body, the face, or the feet may be used. The matching patterns are not limited to those corresponding to a human body; when detecting an object other than a human body, a matching pattern corresponding to a specific object, such as a vehicle, a train, or an airplane, may be used.

Next, a method of determining a matching pattern to be used in human-body detection performed by the determining unit 104 will be described. The first matching subunit 110 of the determining unit 104 is the same as that according to the first embodiment illustrated in FIGS. 2 and 3 and determines the moving direction of an object detected by the first detecting unit 102. The matching-pattern selecting subunit 121 selects a matching pattern to be used in human-body detection in accordance with a moving direction angle α.

In this embodiment, the matching-pattern selecting subunit 121 selects a forward-facing matching pattern for detection processing when the moving direction angle α is: not smaller than 0° and smaller than 45°; not smaller than 135° and smaller than 225°; or not smaller than 315° and smaller than 360°. The matching-pattern selecting subunit 121 selects a lateral-facing matching pattern for detection processing when the moving direction angle α is: not smaller than 45° and smaller than 135°; or not smaller than 225° and smaller than 315°.

In this way, the determining unit 104 selects a forward-facing matching pattern for detection processing when an object detected by the first detecting unit 102 moves in the vertical direction in the image. In contrast, the determining unit 104 selects a lateral-facing matching pattern for detection processing when an object detected by the first detecting unit 102 moves in the horizontal direction in the image. Thus, the determining unit 104 can appropriately select a matching pattern for detection processing in accordance with the movement of the detected object.

The angle ranges of the moving direction angle α corresponding to different flows are not limited to those mentioned above and can be set appropriately. When the moving direction angle α is a predetermined angle or is within a predetermined angle range, the determining unit 104 decides not to perform detection. In this embodiment, the moving direction angle is determined on the basis of a position vector based on two frames. Instead, however, the moving direction angle may be determined on the basis of the scalar product of the position vectors based on multiple frames. If the first detecting unit 102 detects an object by a movement vector, the moving direction of the object may be determined on the basis of the movement vector.

Figure 8:
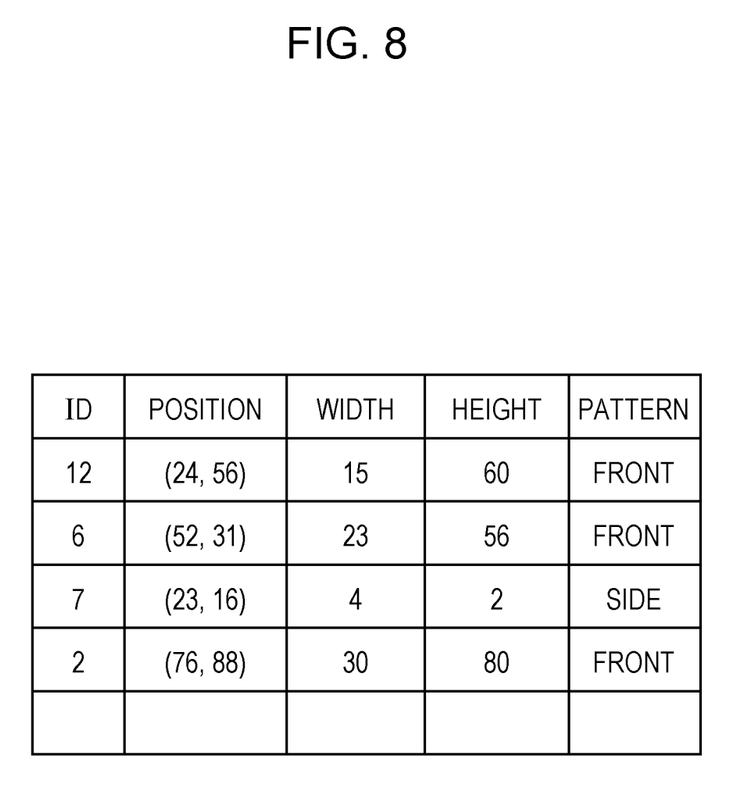
FIG. 8 illustrates an example matching pattern table according to the second embodiment.

FIG. 8 illustrates an example of matching patterns for human-body detection selected by the determining unit 104. The information illustrated in FIG. 8 is stored in the storage unit 108. The information stored in the storage unit 108 is not limited to that illustrated in FIG. 8 and may be any form of information that represents the link between the objects detected by the first detecting unit 102 and the matching patterns. The objects detected by the first detecting unit 102 and the matching patterns do not necessarily have to have a one-to-one correspondence but may have a one-to-many correspondence. By linking multiple matching patterns to a specific moving direction angle 302, an object detected by the first detecting unit 102 and multiple matching patterns can be linked.

The second detection unit 105 uses a matching pattern selected by the determining unit 104 and performs human-body detection on an area detected by the first detecting unit 102. The second detection unit 105 extracts the edge strength of locations detected by the first detecting unit 102 in accordance with the local patterns of the matching pattern selected by the determining unit 104. Then, the determining unit 104 calculates the scalar products of extracted edge strengths and specific edges in the local patterns to determine local characteristic values u. Next, the second detection unit 105 determines the sum of the local characteristic values weighted with w and detects a human body by comparing the sum with a predetermined threshold th. The method of calculating local characteristic values is not limited to calculating the scalar product; other methods, such as predetermined liner determination analysis, may be used. In this way, the second detection unit 105 according to this embodiment selects the matching pattern used for matching an object detected by the first detecting unit 102 in accordance with the object moving direction to perform detection processing.

In this embodiment, a human body is a detection target, but the detection target is not limited thereto. For example, the detection target may be an automobile, an animal, etc. The second detection unit 105 may detect various different specific objects. The method of detecting a specific object in an image by the second detection unit 105 is not limited to pattern matching. For example, an object may be presumed as a human body on the basis of aspect ratio, size, and/or shape of the object. When performing human-body detection, if a person moves horizontally in the image, characteristic parts, such as the face, are not captured in the image; therefore, the accuracy of human-body detection is low if pattern matching is applied. Thus, pattern matching may be applied for detection when the detected object moves vertically in the image, and aspect ratio, size, and/or shape of the object may be used for detection when the object moves horizontally in the image. In this way, the second detection unit 105 can perform detection processing by selecting a matching pattern that is more likely to detect an object in accordance with the orientation of the object, which is presumed from the moving direction of the object detected by the first detecting unit 102.

Similar to the first embodiment, when the third determining subunit 112 of the determining unit 104 does not perform image processing of the object, the second detection unit 105 can be set not to perform detection processing.

In this embodiment, a case in which the determining unit 104 changes the matching pattern in accordance with the moving direction angle has been described. Instead, however, the determining unit 104 or the second detection unit 105 may change the local characteristic values in accordance with the moving direction. For example, the weight added to a local characteristic may be changed in accordance with the moving direction. When detecting a human image in a video movie, if the detected object is moving vertically in the image, the weights added to the local characteristic values of the upper body, such as the face and shoulders, are increased because it is presumed that, if the object is human, a front view of the object is being captured. In contrast, if the detected object is moving horizontally in the image, the weights added to the local characteristic values of the lower body, such as the feet, are increased because it can be presumed that, if the object is human, a lateral view of the object is being captured.

As described above, the second detection unit 105 according to this embodiment changes the type of detection processing in accordance with the moving directions of multiple objects determined by the first determining subunit 110. In this way, a pattern preferable for detecting a human image in accordance with the orientation of an object can be generated. Thus, the probability of detecting a desired object can be increased.

Next, the operation of the image processing apparatus according to this embodiment will be described with reference FIGS. 5 to 9. First, the operation of the image processing apparatus according to this embodiment will be described with reference to FIG. 5.

Steps f1 to f5 in FIG. 5 are the same as those in the first embodiment; therefore, descriptions thereof will not be repeated. In this embodiment, in Step f6 in FIG. 5, the tracking unit 103 links objects detected by the first detecting unit 102 in multiple images acquired by the acquisition unit 101. Then, the determining unit 104 selects a matching pattern to be used for detection (f6). The determining unit 104 changes the matching pattern to be used for detection in accordance with the moving direction of the object. Instead, the determining unit 104 may change the weights added to the local characteristic values of the matching pattern in accordance with the moving direction of the detected object. The operation in Step f6 will be described in detail below with reference to FIG. 7. When the determining unit 104 selects a matching pattern, the image processing apparatus according to this embodiment carries out Steps f7 and f8. Since Steps f7 and f8 are the same as those in the first embodiment, descriptions thereof will not be repeated.

Figure 9:
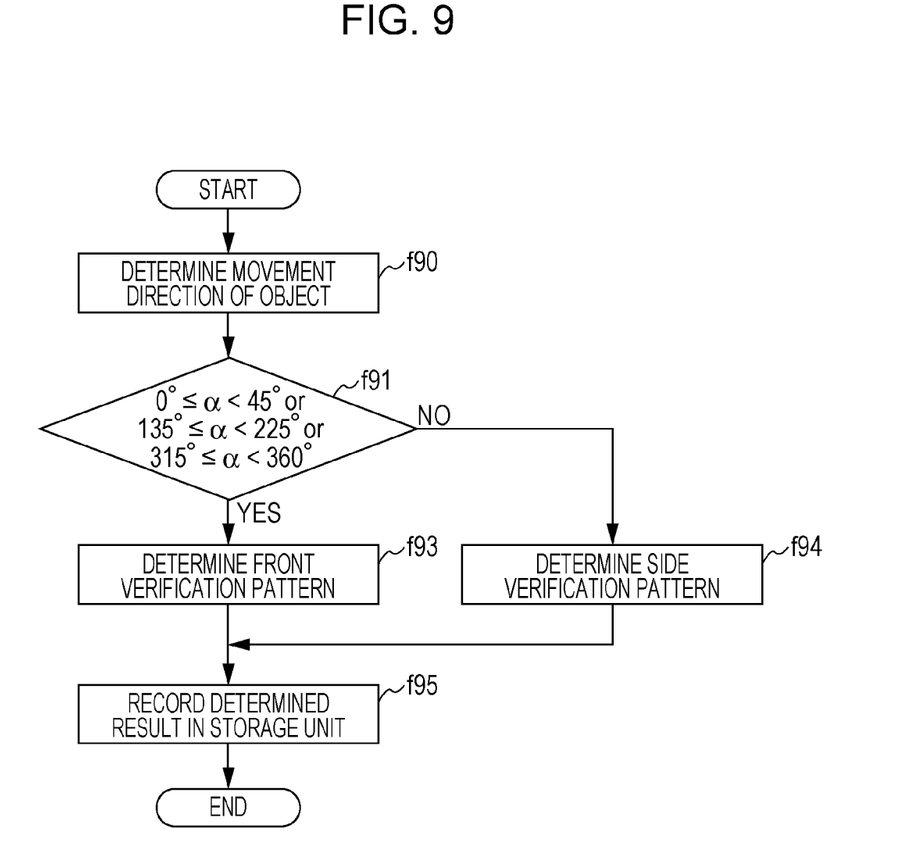
FIG. 9 is a flow chart illustrating the process of matching pattern selection.

Next, the operation of selecting a matching pattern in Step f6 of this embodiment will be described in detail with reference to the flow chart in FIG. 9. The determining unit 104, first, determines the moving direction angle of an object detected by the first detecting unit 102 (f90). Next, the determining unit 104 determines whether the moving direction angle 302 is within a predetermined angle range (f91). In this embodiment, the angle α, which is illustrated in FIG. 4, is determined to be in an angle range of: not smaller than 0° and smaller than 45°; not smaller than 135° and smaller than 225°; or not smaller than 315° and smaller than 360°. When the moving direction angle 302 is within a predetermined angle range (YES in Step f91), the determining unit 104 selects a forward-facing matching pattern for detection (f93). When the moving direction angle 302 is not within a predetermined angle range (NO in Step f91), the determining unit 104 selects a lateral-facing matching pattern for detection (f94). The weights of the local characteristic values of the matching pattern used for detection may be changed in accordance with the determination result of Step f91. For example, the weights of the local characteristic values of the upper body may be increased when the moving direction angle 302 is within a predetermined angle range, and the weights of the local characteristic values of the lower body may be increased when the moving direction angle 302 is not within a predetermined angle range. The angle ranges mentioned above are merely examples and are not limited thereto. In Step f91 in this embodiment, the process follows two different flows; instead there may be more than three flows in which different detection methods are used. Then, the determining unit 104 links, as illustrated in FIG. 8, the selected matching patterns with the objects for which matching patterns are selected and stores this information in the storage unit 108 (f95).

With the configuration described above, the image processing apparatus according to this embodiment can detect a target object using an appropriate matching pattern in accordance with the movement of the object in an image. Thus, the efficiency of detecting a specific object in an image is improved.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279889 filed Dec. 15, 2010 and No. 2010-279890 filed Dec. 15, 2010, which are hereby incorporated by reference herein in their entirety.

What is claimed is:

1. A control apparatus for controlling a detection processing for detecting a specific object, comprising:
   a memory;
   a processor coupled to the memory which executes the following:
   determining a moving direction of a moving object detected in a moving image, wherein the moving direction corresponds to a positional relationship between a position of the moving object in a moving image at a first time and a position of the moving object in the moving image at a second time; and
   detecting, if a moving direction of the detected moving object is a first moving direction, a specific object by comparing the detected moving object with a pattern for detecting the specific object, and detecting, if a moving direction of the detected moving object is a second moving direction being different from the first direction, the specific object by using at least two of a height, width, a ratio between the height and the width, a size, or a shape of the detected moving object.

2. The control apparatus according to claim 1, wherein the processor further executes, in the detecting step, the detection processing in accordance with detections of a plurality of moving objects is prioritized such that the detection processing in accordance with the detections of the plurality of moving objects is performed in an order corresponding to each moving direction of the plurality of moving objects determined by the determining step.

3. The control apparatus according to claim 1, wherein the processor further executes,
   selecting, on the basis of the moving direction of the moving object detected, a specific object among a plurality of specific objects and performing the detection processing to detect whether the moving object having a characteristic is the selected specific object.

4. The control apparatus according to claim 1, wherein the processor further executes performing the detection processing by comparing the moving object with a matching pattern, the matching pattern indicating a shape of the specific object or a part of the specific object.

5. A method of controlling a detection processing for detecting a specific object, comprising the steps of:
   determining a moving direction of a moving object detected in a moving image, wherein the moving direction corresponds to a positional relationship between a position of the moving object in a moving image at a first time and a position of the moving object in the moving image at a second time; and
   detecting, if a moving direction of the detected moving object is a first moving direction, a specific object by comparing the detected moving object with a pattern for detecting the specific object, and detecting, if a moving direction of the detected moving object is a second moving direction being different from the first direction, the specific object by using at least two of a height, width, a ratio between the height and the width, a size, or a shape of the detected moving object.

6. The method of controlling the detection processing, according to claim 5, wherein,
   in the detecting step, the detection processing in accordance with detections of a plurality of moving objects is prioritized such that the detection processing in accordance with the detections of the plurality of moving objects is performed in an order corresponding to each moving direction of the plurality of moving objects determined by in the determining step.

7. A computer-readable recording medium holding a program for instructing a computer to perform the steps of:
   determining a moving direction of a moving object detected in a moving image, wherein the moving direction corresponds to a positional relationship between a position of the moving object in a moving image at a first time and a position of the moving object in the moving image at a second time; and
   detecting, if a moving direction of the detected moving object is a first moving direction, a specific object by comparing the detected moving object with a pattern for detecting the specific object, and detecting, if a moving direction of the detected moving object is a second moving direction being different from the first direction, the specific object by using at least two of a height, width, a ratio between the height and the width, a size, or a shape of the detected moving object.

8. The computer-readable recording medium holding a program according to claim 7, wherein,
   in the detecting, the detection processing in accordance with detections of a plurality of moving objects is prioritized such that the detection processing in accordance with the detections of the plurality of moving objects is performed in an order corresponding to each moving direction of the plurality of moving objects determined by in the determining step.

9. The control apparatus according to claim 1, wherein the detection processing performed varies according to the moving direction determined.

10. The control apparatus according to claim 1, wherein the processor further executes:
    tracking the moving object detected, and
    wherein the determining step determines the moving direction of the tracked moving object on the basis of a result of the tracking of the moving object.

11. The method of controlling the detection processing, according to claim 5, wherein, in the detecting step, the detection processing varies according to the moving direction determined in the determining step.

12. The method of controlling the detection processing, according to claim 5, wherein, in the detecting step, the first moving object and a second moving object are detected,
    wherein, in the detecting step, a first detection processing of detecting whether the first moving object is a first specific object having a first characteristic corresponding to a first moving direction of the first moving object and a second detection processing of detecting whether the second moving object is a second specific object having a second characteristic corresponding to a second moving direction of the second moving object are performed.

13. The computer-readable recording medium holding a program according to claim 7, wherein, the detection processing varies according to the moving direction determined in the determining step.

14. The computer-readable recording medium holding a program according to claim 7, wherein, in the detecting step, the first moving object and a second moving object are detected,
    wherein, in the detecting step, a first detection processing of detecting whether the first moving object is a first specific object having a first characteristic corresponding to a first moving direction of the first moving object and a second detection processing of detecting whether the second moving object is a second specific object having a second characteristic corresponding to a second moving direction of the second moving object are performed.

15. The control apparatus according to claim 1, wherein the specific object corresponds to an object having a predetermined size or an object having a predetermined pattern.

16. The control apparatus according to claim 1, wherein the specific object corresponds to a human body, a human face, an automobile or an animal.

17. A control apparatus for controlling a detection processing for detecting a specific object, comprising:
    a memory;
    a processor coupled to the memory which executes the following:
    determining a moving direction of a moving object detected in a moving image;
    in a case where a plurality of moving objects is detected in the moving image, determining, on the basis of the moving directions of the plurality of moving objects determined in the determining step, an order for performing a determination processing for determining whether at least two of a size, a height, a width, a ratio between the height and the width, and a moving speed of each of the plurality of moving objects meets a predetermined condition;
determining, according to the result of the determination processing, whether to perform a matching processing to detect whether each of the plurality of the moving objects is a specific object;
detecting a first specific object,
detecting a second specific object which is different from the first object, and
if a size of the detected moving object is smaller than a predetermined size, the processor skips detecting the first specific object and the processor executes detecting the second specific object, and if the size of the detected moving object is larger than the predetermined size, the processor executes detecting the first specific object and the second specific object,
wherein the processor does not execute, determining whether the moving object which moves to a predetermined direction is a specific object having predetermined characteristics, a predetermined size or a predetermined shape.

18. The control apparatus according to claim 17, wherein the processor further selects, when the detection processing for detecting whether a first moving object is the specific object is performed, a second moving object in accordance with the order for performing the detection processing and determines whether the detection processing for detecting whether the second moving object is the specific object.

19. The control apparatus according to claim 17, wherein the specific object corresponds to a human body or a human face.

20. A method for controlling a detection processing for detecting a specific object, comprising:
determining a moving direction of a moving object detected in a moving image;
in a case where a plurality of moving objects is detected in the moving image, determining, on the basis of the moving directions of the plurality of moving objects determined in the determining step, an order for performing a determination processing for determining whether at least two of a size, a height, a width, a ratio between the height and the width, and a moving speed of each of the plurality of moving objects meets a predetermined condition;
determining, according to the result of the determination processing, whether to perform a matching processing to detect whether each of the plurality of the moving objects is a specific object;
executing first detection for detecting a first specific object, and
executing second detection for detecting a second specific object which is different from the first object,
wherein if a size of the detected moving object is smaller than a predetermined size, the first detection is not executed and the second detection is executed, and if the size of the detected moving object is larger than the predetermined size, the first detection and the second detection are executed.

21. A computer-readable recording medium holding a program for instructing a computer to perform the steps of:
determining a moving direction of a moving object detected in a moving image;
in a case where a plurality of moving objects is detected in the moving image, determining, on the basis of the moving directions of the plurality of moving objects determined in the determining step, an order for performing a determination processing for determining whether at least two of a size, a height, a width, a ratio between the height and the width, and a moving speed of each of the plurality of moving objects meets a predetermined condition; and
determining, according to the result of the determination processing, whether to perform a matching processing to detect whether each of the plurality of the moving objects is a specific object,
wherein in the detecting step, if a moving direction of the detected moving object is vertical on a display plane of the moving image, the specific object is detected by comparing the detected moving object with a pattern for detecting the specific object, and in the detecting step, if a moving direction of the detected moving object is horizontal in the display plane, the specific object is detected by using at least one of the height, the width, the ratio between the height and the width, the size, or the shape of the detected moving object.

22. The control apparatus according to claim 1, wherein the processor further executes, if a plurality of objects is detected, determining, based on a number of times a detection process for the specific object is performed or a number of the specific objects being detected, whether to continue the detection process for the specific object.

23. The control apparatus according to claim 1, wherein the processor skips determining whether the moving object which moves to a predetermined direction is a specific object having predetermined characteristics, a predetermined size or a predetermined shape.

24. The control apparatus according to claim 1, wherein the processor detects, if a moving direction of the detected moving object is vertical on a display plane of the moving image, the specific object by comparing the detected moving object with a pattern for detecting the specific object, and the processor detects, if a moving direction of the detected moving object is horizontal in the display plane, the specific object by using at least one of the height, the width, the ratio between the height and the width, the size, or the shape of the detected moving object.

25. The method of controlling the detection processing, according to claim 5, wherein, in the detecting step, if a moving direction of the detected moving object is vertical on a display plane of the moving image, the specific object is detected by comparing the detected moving object with a pattern for detecting the specific object, and in the detecting step, if a moving direction of the detected moving object is horizontal in the display plane, the specific object is detected by using at least one of the height, the width, the ratio between the height and the width, the size, or the shape of the detected moving object.

26. The computer-readable recording medium holding a program according to claim 7, wherein the program further instructs the steps of executing first detection for detecting a first specific object, and executing second detection for detecting a second specific object which is different from the first object, and
wherein if a size of the detected moving object is smaller than a predetermined size, the first detection is not executed and the second detection is executed, and if the size of the detected moving object is larger than the predetermined size, the first detection and the second detection are executed.

* * * * *